United States Patent
Chen et al.

(10) Patent No.: US 7,164,469 B1
(45) Date of Patent: Jan. 16, 2007

(54) METHOD OF EVALUATING FIBER PMD USING COMPOSITE POTDR TRACE

(75) Inventors: Xin Chen, Corning, NY (US); Timothy L. Hunt, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/174,137

(22) Filed: Jun. 30, 2005

(51) Int. Cl.
  *G01N 21/00* (2006.01)
(52) U.S. Cl. .................................... 356/73.1
(58) Field of Classification Search ............. None
  See application file for complete search history.

(56) References Cited

U.S. PATENT DOCUMENTS

| | | | |
|---|---|---|---|
| 5,384,635 A | 1/1995 | Cohen et al. | 356/73.1 |
| 5,432,637 A | 7/1995 | Hakimi | 359/497 |
| 5,621,518 A | 4/1997 | Beller | 356/73.1 |
| 5,652,715 A | 7/1997 | Hanson | 364/574 |
| 5,966,207 A | 10/1999 | Haskins et al. | 356/73.1 |
| 6,204,924 B1 | 3/2001 | Cyr | 356/453 |
| 6,211,950 B1 | 4/2001 | Walter | 356/73.1 |
| 6,229,599 B1 | 5/2001 | Galtarossa | 356/73.1 |
| 6,630,992 B1 | 10/2003 | Vobian et al. | 356/73.1 |
| 6,724,469 B1 | 4/2004 | Leblanc | 356/73.1 |
| 6,822,793 B1 | 11/2004 | Xie et al. | 359/497 |
| 6,940,588 B1 * | 9/2005 | Woodside et al. | 356/124 |
| 6,946,646 B1 * | 9/2005 | Chen et al. | 250/227.17 |
| 2004/0046995 A1 | 3/2004 | Silverbrook et al. | 358/1.15 |
| 2004/0084611 A1 | 5/2004 | Chen et al. | 250/225 |
| 2004/0136636 A1 | 7/2004 | Rogers | 385/11 |
| 2004/0175171 A1 | 9/2004 | Kokkinos | 398/14 |
| 2005/0002017 A1 | 1/2005 | Haran | 356/73.1 |
| 2005/0018174 A1 | 1/2005 | Yano et al. | 356/73.1 |
| 2005/0140965 A1 * | 6/2005 | Boroditsky et al. | 356/73.1 |

FOREIGN PATENT DOCUMENTS

| | | |
|---|---|---|
| WO | 1998/36256 | 8/1998 |
| WO | 2002/095349 | 11/2002 |
| WO | 2004/010098 | 7/2003 |
| WO | 2005/060130 | 6/2005 |

OTHER PUBLICATIONS

Galtarossa et al., "*Measurements of beat length and perturbation length in long single-mode fibers*", Optics Letters, vol. 25, No. 6, Mar. 15, 2000, pp. 384-386.

Ellison et al., "*A Fully Polarimetric Optical Time-Domain Reflectometer*", Photonics Technology Letters, vol. 10, No. 2, Feb. 1998, pp. 246-248.

Ross, "*Birefringence measurement in optical fibers by polarization-optical time-domain reflectometry*", Applied Optics, vol. 21, No. 19, Oct. 1, 1982, pp. 3489-3495.

(Continued)

*Primary Examiner*—Tu T. Nguyen
(74) *Attorney, Agent, or Firm*—Joseph M. Homa (57) ABSTRACT

A method for screening fiber polarization mode dispersion using a polarization optical time domain reflectometer. A pulse radiation is emitted into the fiber under test, and the backscattered radiation is measured by the POTDR and used to obtain a POTDR trace. A composite trace of more than one POTDR trace is obtained. The composite trace is then analyzed to compare the variation of signals along the length of the fiber, the variation in signals relating to the level of PMD along the length of the fiber. Because high levels of PMD correspond to localized levels of low variability, by setting the variability of signal threshold sufficiently low, fibers having unacceptably high localized PMD can be identified and removed.

20 Claims, 4 Drawing Sheets

OTHER PUBLICATIONS

Ozeki et al., "*Birefringence distribution along fiber length*", OFC '96 Technical Digest, pp. 295-297.

Schuh et al., "*Theoretical analysis and measurement of the effect of fiber twist on the polarization OTDR of optical fibers*", OFC '96 Technical Digest, pp. 297-298.

Galtarossa et al., "*Spatially Resolved PMD Measurements*", Journal of Lightwave Technology, vol. 22, No. 4, Apr. 2004, pp. 1103-1115.

Rogers, "*Polarization-optical time domain reflectometry: a technique for the measurement of field distributions*", Applied Optics, vol. 20, No. 6, Mar. 15, 1981, pp. 1060-1074.

Chen et al., "*Properties of polarization evolution in spun fibers*", Optics Letters, vol. 28, No. 21, Nov. 1, 2003, pp. 2028-2030.

Huttner et al., "*Distributed PMD Measurement with a Polarization-OTDR in Optical Fibers*", Journal of Lightwave Technology, vol. 17, No. 10, Oct. 1999, pp. 1843-1848.

Ozeki et al., "*Polarization-mode dispersion measurement by an optical time-domain reflectometer with polarimetry assuming backscattering by randomly oriented nonspherical particles*", Optics Letters, vol. 28, No. 15, Aug. 1, 2003, pp. 1293-1295.

Rogers, "*Distributed Fibre Measurement using Backscatter Polarimetry*", Optical Fiber Sensors Conference Technical Digest, 2002, vol. 1, pp. 367-370.

Conibear et al., "*Locating High PMD Sections of an Overhead Cable using Polarization-OTDR*", Symposium on Optical Fiber Measurements, 2004, Technical Digest, pp. 103-108.

Kim et al., "*Use of Polarization-Optical Time Domain Reflectometry for Observation of the Faraday Effect in Single-Mode Fibers*", Journal of Quantum Electronics, vol. QE-18, No. 4, Apr. 1982, pp. 455-456.

A. Fougères, "*Polarization OTDR: Locating High-PMD Fibers*", Application Note 087, www.exfo.com, ANOTE087.lan, © 2002 Exfo Electro-Optical Engineering Inc.

Vengsarkar et al., "*Polarisation Optical time Domain Reflectometry For Statistical Evaluation Of Polarisation Mode Dispersion*", Electronics Letters, vol. 29, No. 10, May 13, 1993, pp. 848-850.

Nakazawa, "*Theory of Backward Rayleigh Scattering in Polarization-Maintaining Single-Mode Fibers and Its Application to Polarization Optical Time Domain Reflectometry*", Journal of Quantum Electronics, vol. QE-19, No. 5, May 1983, pp. 854-861.

Wegmuller et al., "*Distributed Beatlength Measurement in Single-Mode Fibers With Optical Frequency-Domain Reflectometry*", Journal of Lightwave Technology, vol. 20, No. 5, May 2002, pp. 828-835.

Sunnerud et al., "*Measurement of Polarization Mode Dispersion Accumulation Along Installed Optical Fibers*", Photonics Technology Letters, vol. 11, No. 7, pp. 860-862, 1999.

Huttner et al., "*Local Birefringence Measurements in Single-Mode Fibers with Coherent Optical Frequency-Domain Reflectometry*", Photonics Technology Letters, vol. 10, No. 10, Oct. 1998, pp. 1458-1460.

Gisin et al., "*Polarization Mode Dispersion of Short and Long Single-Mode Fibers*", Journal of Lightwave Technology, vol. 9, No. 7, Jul. 1991, pp. 821-827.

Chen et al., "*Scaling properties of polarization mode dispersion of spun fibers in the presence of random mode coupling*", Optics Letters, vol. 27, No. 18, pp. 1595-1597, 1995.

Wuilpart et al., "*Polarization Mode Dispersion Mapping in Optical Fibers With a Polarization-OTDR*", Photonics Technology Letters, vol. 14, No. 12, Dec. 2002, pp. 1716-1718.

Tardy et al., "*Fiber PMD analysis for optical-fiber cable using polarization OTDR*", OFC '95 Optical Fiber Communication, Summaries of Papers Presented at the Conference on Optical Fiber Communication, vol. 8, Technical Digest Series, Postconference Edition, 1995, pp. 236-139.

Fougères et al., "*Detection of high PMD sections along installed fibers by means of a polarization-OTDR*", Proceedins of SPIE vol. 4906, 2002, pp. 319-327.

Wegmuller et al., "*Investigation of Spun Fibers using High Resolution Reflectometry*", Presented at OFC/NFOEC Conference on Mar. 8, 2005, 3 pages, available on CD-ROM from Optical Society of America, Washington, DC.

\* cited by examiner

METHOD OF EVALUATING FIBER PMD USING COMPOSITE POTDR TRACE

BACKGROUND OF THE INVENTION

1. Field of the Invention

The present invention relates generally to optical fibers, and particularly to a method for identifying optical fibers which exhibit elevated levels of polarization mode dispersion (PMD).

2. Technical Background

PMD is an important factor in the design of state-of-art fiber optic transmission systems. The effect of PMD in fiber systems is evident when, after propagating a sufficient distance in the network, one digital pulse may spread in the time domain and become indistinguishable from a nearby pulse. The pulse spreading from PMD can introduce errors into the data transmission, effectively limiting the transmission rate of the pulses or the maximum distance of the concatenated fiber medium.

PMD originates from fiber geometric deformation and stress asymmetry. Without external perturbations, the PMD grows linearly at the rate which corresponds to the level of intrinsic fiber birefringence as the fiber length increases. However, fibers are subject to random external perturbations that induce mode coupling between different polarization modes. The external mode coupling is typically characterized by the frequency of its occurrence 1/h, where h is called mode-coupling length. It has been found that, for fibers in the long length region (fiber having a length l>>h), statistically the fiber PMD is closely related to both the fiber beatlength and mode coupling length, $$PMD = \frac{\lambda}{cL_b}\sqrt{h} \quad (1)$$

where $\lambda$ is the wavelength of the light, c is the speed of the light, $L_b$ is the beatlength of the fiber as explained in "Polarization Mode Dispersion of Short and Long Single-Mode Fibers", Journal of Lightwave Technology 9, 821 (1991). Beatlength reflects the intrinsic birefringence that is built into the fiber during the manufacturing process. Mode-coupling length reflects the impact of fiber deployments, and may change as fiber deployment conditions change. The understanding of Eq. (1) has important implications on how PMD is measured and interpreted. Measurement schemes for both fiber beatlength and PMD have been developed.

An assumption behind Eq. (1) is that the fibers are linear birefringent or unspun. In recent years, fiber spinning has been introduced during the fiber draw process to reduce fiber PMD. A significant portion of fibers sold in the market today are spun fibers. For spun fibers, in addition to its dependence on fiber birefringence and random mode coupling, fiber PMD also depends on fiber spinning parameters. For most of the cases when fiber spinning is not operated under optimal condition (e.g. when maximum PMD reduction is not achieved), fiber PMD still depends on fiber birefringence or fiber beatlength (before the fiber is spun) and mode-coupling length. However, as explained in "Scaling properties of polarization mode dispersion of spun fibers in the presence of random mode coupling", OPTICS LETTERS, Vol. 27, No. 18, 1595, (2002), fiber spinning introduces an additional factor $|J_0(2\alpha/\eta)|$ for a sinusoidally spun fiber, where $J_0$ is the zero-order Bessel function, $\alpha$ is the spin magnitude and $\eta$ is the angular frequency of the sinusoidal profile, that is used to correct Eq. (1).

Fiber manufacturers are interested in providing fibers with uniformly low PMD, particularly for products targeted for high data rate, long-haul transmission systems. Unfortunately, screening fiber PMD on an entire length of fiber directly is typically a difficult and expensive processing step.

Traditional PMD measurements typically involve obtaining the total differential group delay (DGD) value for the whole fiber under test. When fiber DGD values are elevated beyond a reasonable level, it suggests that at least a portion of the fiber under test carries elevated PMD values, and the fiber is subsequently rejected. Conversely, when the DGD value of a fiber is low, it is natural to assume that fiber PMD is acceptable. However, in reality, the fiber PMD has a distributed nature, and consequently fiber PMD can vary from one segment along the length of the fiber to another. The whole fiber can then be considered as a concatenation of many segments of unperturbed fibers with mode-coupling happening at the junction of fiber segments. Although for a large ensemble of fibers, the overall DGD follows statistical behaviors such as those shown in Eq. (1), for an individual fiber, because of mode coupling, DGD values can be partially canceled from one segment of fiber to another segment of fiber, and the overall fiber could demonstrate a low DGD value. Thus a low value in the total DGD of the fiber under test does not necessarily imply that the fiber has uniformly low PMD values. When such fiber is deployed in the field and the mode-coupling conditions change, there is a high probability that the fiber will exhibit higher DGD values.

PMD measurement in fiber manufacturing facilities often involves measuring a small percentage of fibers, with the frequency of sampling based on process capability. During typical PMD test measurements, fiber samples having a length of about 1 km are wound on a large diameter measurement spool with low tension. This configuration ensures that the induced birefringence and PMD due to bending and winding tension is minimal. Although this type of measurement yields accurate results for the particular segment of fiber under test, it is difficult to use this method of screening to deterministically filter out all fibers having unacceptable level of PMD values, due to the distributed nature of PMD. In addition, this form of screening is expensive, as the sampled fibers can not be reused. Therefore, there is a need for more robust screening method that can take the distributed nature of fiber PMD into account.

Accordingly, alternative methods that can conduct the measurements distributedly and non-destructively for identifying fibers with high PMD would be of great value to the industry in that such methods would reduce measurement (quality control) costs, and therefore overall manufacturing costs for low PMD optical fibers.

SUMMARY OF THE INVENTION

The present invention relates to a method for measuring polarization mode dispersion (PMD) in an optical fiber. The optical fiber can be screened for PMD levels that are distributed along the length of the fiber. Radiation is sent or launched into a length of optical fiber along its longitudinal axis. The radiation is preferably a pulsed radiation, such as pulsed radiation emitted from a laser source.

Radiation which is backscattered or reflected back through the fiber from the launched radiation is then measured and analyzed to obtain information about the variation in intensity of the backscattered radiation along the length of the fiber. The variation in intensity can then be related to the level of polarization mode dispersion in the optical fiber to identify regions in the length of the fiber which exhibit disparate and/or unacceptable levels of PMD. Such measurements can be employed to non-destructively determine whether the PMD of the fiber is above a predetermined threshold at some point along the length of the fiber without having to destroy it.

A method for measuring polarization mode dispersion in an optical fiber is disclosed herein. The optical fiber has a longitudinal axis and a length along the longitudinal axis. The method comprises: (a) sending a plurality of polarized input light pulses into a first end of the length of the optical fiber via an optical path, each polarized input light pulse thereby causing a respective backscattered light signal to exit first end of the optical fiber, traveling backward relative to the direction of the input pulse and to enter the optical path, whereby a plurality of input pulse-backscatter signal pairs, i.e. pulse-signal pairs, are generated from the input light pulses and respective backscattered light signals; (b) effecting a polarization sensitive measurement of the backscattered light signals, thereby obtaining backscatter intensity traces corresponding to a portion of the length of optical fiber; (c) nondegenerately modifying the polarization of the optical path between the passage of at least two pulse-signal pairs; (d) generating an intensity level composite trace corresponding to the portion of the length of optical fiber by linearly combining the backscatter intensity traces, that is, by summing (i) at least one of the backscatter intensity traces, multiplied by a first weighting coefficient, and (ii) at least one other backscatter intensity trace, multiplied by another weighting coefficient of opposite sign to the first weighting coefficient; and (e) analyzing the variation of intensity level of the composite trace, wherein the analyzing step comprises analyzing the variation of intensity over a sliding window of data from the composite trace and moving the window of data lengthwise along the portion of the length of the fiber while continuing to analyze the variation of intensity to thereby produce information related to the local variation in intensity along the portion of the length of the fiber, and relating the level of variation of intensity level to the polarization mode dispersion (PMD) distribution in the fiber.

The polarization sensitive measurement preferably comprises passing the backscattered light signals through a polarizer and before entering into a detector.

The optical path comprises at least one optical component. In preferred embodiments, nondegenerately modifying the polarization of the optical path comprises altering an orientation angle of an optical component disposed in the optical path relative to the direction of the optical path, the optical component being disposed in the optical path, wherein the magnitude of the change in the polarization angle is not equal to, or substantially not equal to, a whole number multiple of 180 degrees. A whole number multiple includes a multiple of zero, so the change in the polarization angle is substantially not equal to a whole number multiple of 180 degrees, which includes substantially not equal to 0 degrees.

The optical path comprises at least one polarization component, wherein at least one of the polarization components is a polarizer, so the optical path comprises at least one polarizer. The optical path may further comprise at least one other polarization component, such as a (second) polarizer or a wave-plate. Nondegenerately modifying the polarization of the optical path preferably comprises adjusting the polarization angle of the at least one polarization component. In some embodiments, the modification comprises inserting an additional polarization component into the optical path. In other embodiments, the modification comprises removing a polarization component from the optical path. In other embodiments, the at least one polarization component is disposed within an OTDR.

In preferred embodiments of the present invention, the optical path comprises an input path portion and a return path portion. In some embodiments, the input path portion comprises at least one polarization component. In other embodiments, the return path portion comprises at least one polarization component. Preferably, the input path portion comprises at least one polarizing component and the return path portion comprises at least one polarizing component. Preferably, the return path portion comprises a polarization analyzer, i.e. a polarizer disposed in the optical path before a detector. In a preferred embodiment, the detector is disposed within an OTDR.

In other preferred embodiments of the present invention, the input pulses and the backscattered light signals share substantially the same optical path to and from, respectively, the optical fiber under test.

Analyzing the variation of intensity level of the composite trace comprises analyzing the sliding window of data within which a standard deviation is calculated over the window. Preferably, the standard deviation is calculated in log scale. With a log scale, the calculated variation of signal is independent of the level of light intensity or power that is launched into the fiber under test, as it only affects the overall level of measured signal. The analyzing step preferably comprises spatially resolving the standard deviation with respect to the length of optical fiber. In an alternate embodiment, wherein the analyzing step comprises analyzing the sliding window of data within which a local maximum and a local minimum within the sliding window are calculated and an average of the local maximum and local minimum within the sliding window is calculated.

The analyzing step further preferably comprises identifying a section of the optical fiber having a minimum polarization mode dispersion which is greater than a selected, or threshold, polarization mode dispersion. Preferably, the selected threshold polarization mode dispersion is 0.05 ps/km$^{1/2}$ or higher.

Thus, in preferred embodiments, the variation of intensity level of the composite trace is used to determine whether a region along the length of the fiber exhibits PMD which is above a predetermined threshold value for PMD, and/or to identify areas of higher or lower PMD along the length of the fiber.

In a preferred embodiment, the plurality of pulses is emitted from an OTDR, and the backscattered radiation is measured with an OTDR. In some preferred embodiments, the pulses emitted from the OTDR are polarized and the backscattered radiation emitted from the optical fiber is directed through a polarization analyzing component prior to returning to the OTDR.

In one set of preferred embodiments, the optical fiber is wound around a spool while the measurement is taken. In some embodiments, the spool has a barrel radius between about 7 and 20 cm.

In another set of preferred embodiments, the optical fiber is disposed within a cable while the measurement is taken.

In one set of preferred embodiments, spun optical fiber is measured. In another set of preferred embodiments, unspun optical fiber is measured.

Preferably, the window of data comprises a width between about 0.5 and 2.0 km.

Preferably, the input pulses comprise a pulse width between about 10 and 500 ns, more preferably between about 50 and 200 ns.

DETAILED DESCRIPTION OF THE PREFERRED EMBODIMENTS

In preferred embodiments, regions of lower or higher variability, relative to other regions along the length of the fiber, are identified to thereby identify areas of higher or lower polarization mode dispersion along the length of the fiber. This can be accomplished, for example, by analyzing a sliding window of data within which a standard deviation (preferably in log scale) is calculated over the window, and moving the window of data lengthwise along the length of the fiber to produce information related to the local variation along the length of the fiber. In some preferred embodiments, when fiber PMD values are above a certain level, the variation of signals (VOS) drops below a predetermined threshold. In such instances the fiber which falls below the predetermined threshold can then be easily identified and rejected. The predetermined threshold can be selected by mapping the variation of signals against actual measured polarization mode dispersion levels for one or more fibers of the same type. In this way, the level of variation of signals may be selected above or below which the optical fiber passes or fails for a given level of PMD, and thus the fiber can be screened for PMD.

The methods and apparatus of the present invention result in a number of advantages over previous methods for measuring PMD. First, using the methods disclosed herein, PMD measurements may be conducted non-destructively and in a distributed manner along the length of the fiber. Consequently, these methods can be used to test both newly manufactured fiber as well as fiber that is already installed in a telecommunications system. The methods described herein have proven to be useful and valid both for spun and unspun fiber products. High spatial resolution OTDRs are not needed, beyond what are already available in existing commercial OTDRs. Most importantly, using the methods disclosed herein, the PMD of a fiber can be measured along the length of the fiber without destroying it. Using the methods disclosed herein, fibers greater than 15 km long and even greater than 25 km long have been successfully analyzed for PMD.

In one preferred embodiment, the present invention relates to a method for measuring polarization mode dispersion in an optical fiber having a longitudinal axis and a length along the longitudinal axis, the method comprising: (a) sending a first polarized input light pulse into one end of the length of the optical fiber via an optical path, thereby causing a first backscattered light signal to exit the optical fiber and to enter the optical path; then (b) effecting a polarization sensitive measurement of the first backscattered light signal, thereby obtaining a first backscatter intensity trace corresponding to a portion of the length of optical fiber; then (c) nondegenerately modifying the polarization of the optical path; then (d) sending a second polarized input light pulse into the one end of the length of the optical fiber via the optical path, thereby causing a second backscattered light signal to exit the optical fiber and to enter the optical path; then (e) effecting a polarization sensitive measurement of the second backscattered light signal, thereby obtaining a second backscatter intensity trace corresponding to the portion of the length of optical fiber; then (f) generating an intensity level composite trace corresponding to the portion of the length of optical fiber by summing (i) the first backscatter intensity trace, multiplied by a weighting coefficient A, and (ii) the second backscatter intensity trace, multiplied by a weighting coefficient B, wherein A and B have opposite mathematical signs; then (g) analyzing the variation of intensity level of the composite trace, wherein the analyzing step comprises analyzing the variation of intensity over a sliding window of data from the composite trace and moving the window of data lengthwise along the portion of the length of the fiber while continuing to analyze the variation of intensity to thereby produce information related to the local variation in intensity along the portion of the length of the fiber, and relating the level of variation of intensity level to the polarization mode dispersion (PMD) distribution in the fiber. The method may further comprise sending a third polarized input light pulse into one end of the length of the optical fiber via an optical path, thereby causing a third backscattered light signal to exit the optical fiber and to enter the optical path; then (b) effecting a polarization sensitive measurement of the third backscattered light signal, thereby obtaining a third backscatter intensity trace corresponding to a portion of the length of optical fiber; then in step (g), adding the third backscatter intensity trace, multiplied by a weighting coefficient C, to the sum. In other preferred embodiments, the method comprises summing more than three non-degenerately obtained backscatter intensity traces.

In another preferred embodiment, the present invention relates to a method for measuring polarization mode dispersion in an optical fiber having a longitudinal axis and a length along the longitudinal axis, the method comprising: (a) sending a first polarized input light pulse into the length of the optical fiber via an optical path, thereby causing a first backscattered light signal to exit the optical fiber and to enter the optical path; then (b) polarizing the first backscattered light signal; then (c) detecting the polarized first backscattered light signal, thereby obtaining a first backscatter intensity trace corresponding to a portion of the length of optical fiber; then (d) nondegenerately modifying the polarization of the optical path; then (e) polarizing the second backscattered light signal; then (f) detecting the polarized second backscattered light signal, thereby obtaining a second backscatter intensity trace corresponding to a portion of the length of optical fiber; then (g) generating an intensity level composite trace corresponding to the portion of the length of optical fiber by summing (i) the first backscatter intensity trace, multiplied by a weighting coefficient A, and (ii) the second backscatter intensity trace, multiplied by a weighting coefficient B, wherein A and B have opposite mathematical signs; then (h) analyzing the variation of intensity level of the composite trace, wherein the analyzing step comprises analyzing the variation of intensity over a sliding window of data from the composite trace and moving the window of data lengthwise along the portion of the length of the fiber while continuing to analyze the variation of intensity to thereby produce information related to the local variation in intensity along the portion of the length of the fiber, and relating the level of variation of intensity level to the polarization mode dispersion (PMD) distribution in the fiber. The method may further comprise sending a third polarized input light pulse into one end of the length of the optical fiber via an optical path, thereby causing a third backscattered light signal to exit the optical fiber and to enter the optical path; then (b) effecting a polarization sensitive measurement of the third backscattered light signal, thereby obtaining a third backscatter intensity trace corresponding to a portion of the length of optical fiber; then in step (g), adding the third backscatter intensity trace, multiplied by a weighting coefficient C, to the sum.

A preferred source for both emitting the pulse radiation and measuring the radiation which is backscattered or reflected back through the fiber is an optical time domain reflectometer (OTDR). While OTDRs have been used to measure a variety of properties of optical fibers, they are most commonly employed to measure fiber attenuation and to identify locations where breaks or discontinuities occur in the fiber. By OTDR as used herein, we mean a device which is capable of sending a light down an optical waveguide fiber and observing the small fraction of light that is scattered back towards the detector. Typical OTDRs can resolve the intensity of radiation backscattered along the length of the fiber. Most of the OTDRs achieve this by sending pulsed radiation into the fiber under test and measuring the backscattered radiation at a given timing. While typical pulsewidths may range from 0.5 meters (5 nanoseconds) to 2000 meters (20 microseconds), the present invention preferably employs pulse widths of between about 10 and 500 ns, more preferably between about 50 and 200 ns. Preferably, the OTDR is a polarization OTDR, which is an OTDR capable of emitting polarized radiation and analyzing the polarized radiation from backscattered light.

Figure 1:
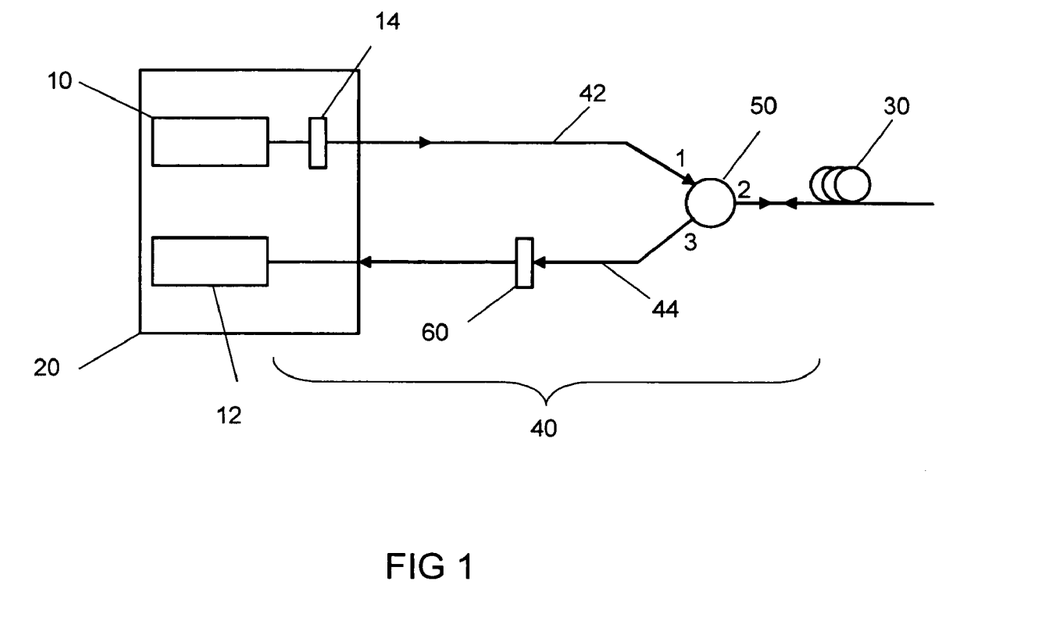
FIG. 1 schematically illustrates a first arrangement suitable for use in practicing the method of the present invention which includes an emitter and a light detector.

FIG. 1 illustrates a first arrangement suitable for use in practicing the method of the present invention which includes a source of light pulses such as emitter 10 and a light detector 12. The emitter 10 and the detector 12 may be separate components or may be disposed in an OTDR 20, which is capable of generating and sending a pulse of laser light into an optical waveguide fiber 30. The OTDR is capable of injecting a series of optical pulses into an optical fiber 30 under test via an optical path 40, and the OTDR 20 can also detect, from the same end of the fiber 30, via the optical path 40, light that is scattered back to extract information therefrom. As used herein, optical path refers to the path that input pulses travel on toward, and backscatter return signals travel away from, an optical fiber under test. The optical path comprises at least one optical component. In FIG. 1, the optical path 40 comprises an input portion 42 and a return portion 44. The intensity of the return pulses is measured and integrated as a function of time, and is plotted as a function of fiber length. OTDR 20 launches a pulsed radiation into the optical fiber 30 which is to be tested for PMD. In FIG. 1, OTDR 20 comprises a polarization means 14, such as a polarizer. An optical circulator 50 is configured to direct the initial pulse of light emitted from the OTDR 20 to the fiber 30 under test. As a result of Rayleigh backscattering, some light is back reflected through the fiber 30 back towards the OTDR 20. In a preferred embodiment, these backscattered signals or pulses are diverted back to the OTDR 20 through a different path portion than the input pulse traveled on. For example, in the embodiment illustrated in FIG. 1, the backscattered pulse is directed through polarization analyzer 60 (which is essentially a polarizer) before the backscattered light reaches the detector 12 inside the OTDR 20. The combination of the polarization analyzer 60 and the detector 12 permit polarization sensitive measurements to be taken of the light propagating through the optical path 40, and in particular through the return portion 44 of path 40. Note that in the optical circulator 50 illustrated, the propagation or traveling of light in each port is unidirectional. Specifically, the light is allowed to travel from port 1 to port 2, and from port 2 to port 3, unidirectionally. The optical pulses exiting the OTDR 20 are thus already polarized, which is the case for some commercial OTDRs such as those having a polarization means 14. When the OTDR emission is already polarized (i.e. as in the case of a POTDR), a polarizer between the OTDR 20 and the optical fiber 30 under test is not needed, thereby eliminating one source of loss, which can help to gain longer dynamic range for the POTDR.

Figure 2:
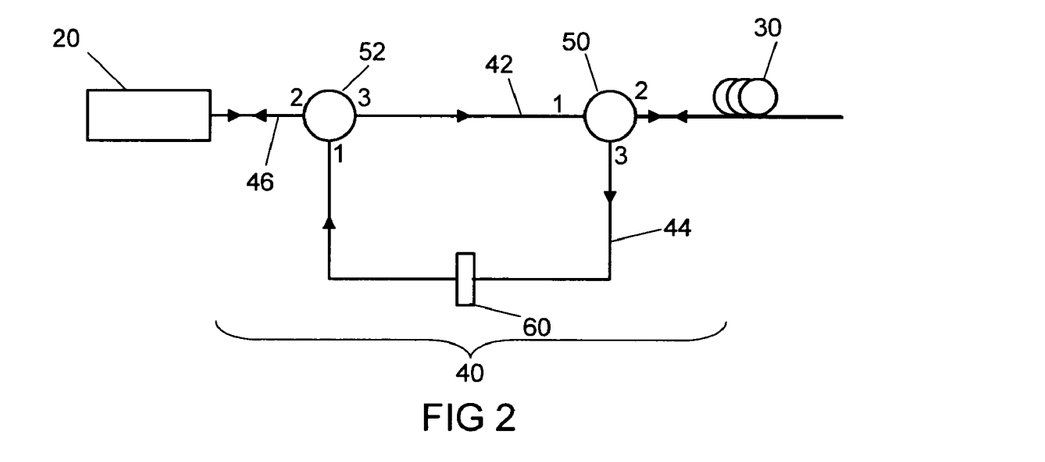
FIG. 2 schematically illustrates a second arrangement suitable for use in practicing the method of the present invention which includes a POTDR apparatus having polarization capability and an optical fiber path comprising a shared input/output fiber connecting line portion.

FIG. 2 illustrates a suitable arrangement similar to FIG. 1 but showing a POTDR 20 apparatus which has polarization capability and which utilizes a shared input/output fiber connecting line portion 46 as part of the optical path 40. In the embodiment illustrated in FIG. 2, two optical circulators 50 and 52 and one polarizer 60 are provided in the optical path 40. The optical circulators 50 and 52 are configured to direct the initial pulse of light emitted from the OTDR 20 to the fiber 30 under test and to direct the backscattered pulse through polarization analyzer 60 (which is essentially a polarizer) in the return portion 44 of the optical path 40 before the backscattered light reaches the detector inside the OTDR 20. Note that in the optical circulators 50 and 52 which are illustrated, only port 2 allows the light to come in and out. The traveling of light in all other ports is unidirectional. Specifically, the light is allowed to travel from port 1 to port 2, and from port 2 to port 3 unidirectionally.

Figure 3:
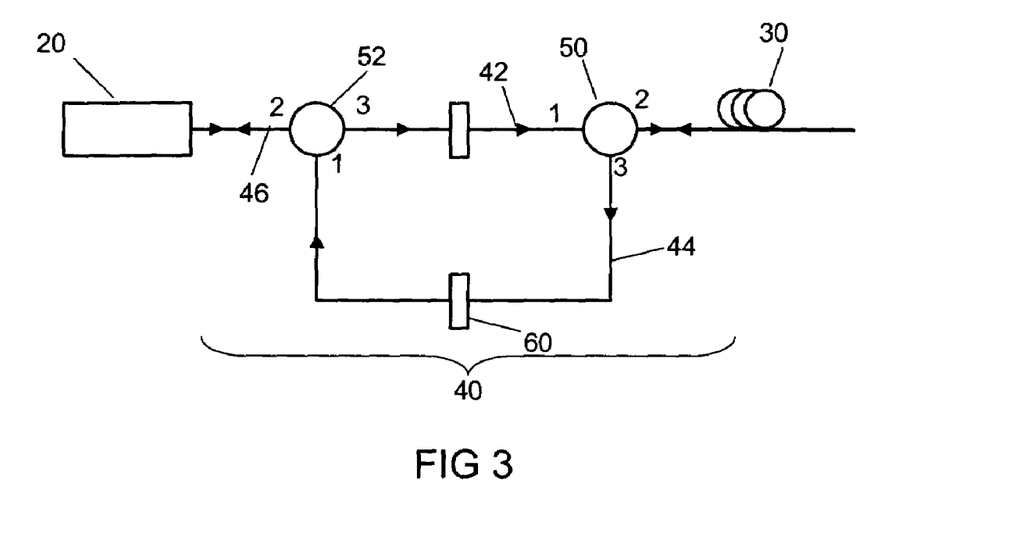
FIG. 3 schematically illustrates a third arrangement suitable for use in practicing the method of the present invention.

FIG. 3 illustrates another suitable arrangement comprising either a conventional OTDR (without polarization of the light exiting the OTDR) or a POTDR apparatus which has polarization capability, 20. In the embodiment illustrated in FIG. 3, two optical circulators 50 and 52 are provided. The propagation of light through the optical path 40 is similar to the light travel in the arrangement of FIG. 2. Polarizer 62 is inserted in the input portion 42 of the optical path 40, and polarization (analyzer) 60 is inserted in the return portion 44 of the optical path 40. Polarization means within the OTDR 20 is optional in this arrangement.

Figure 4:
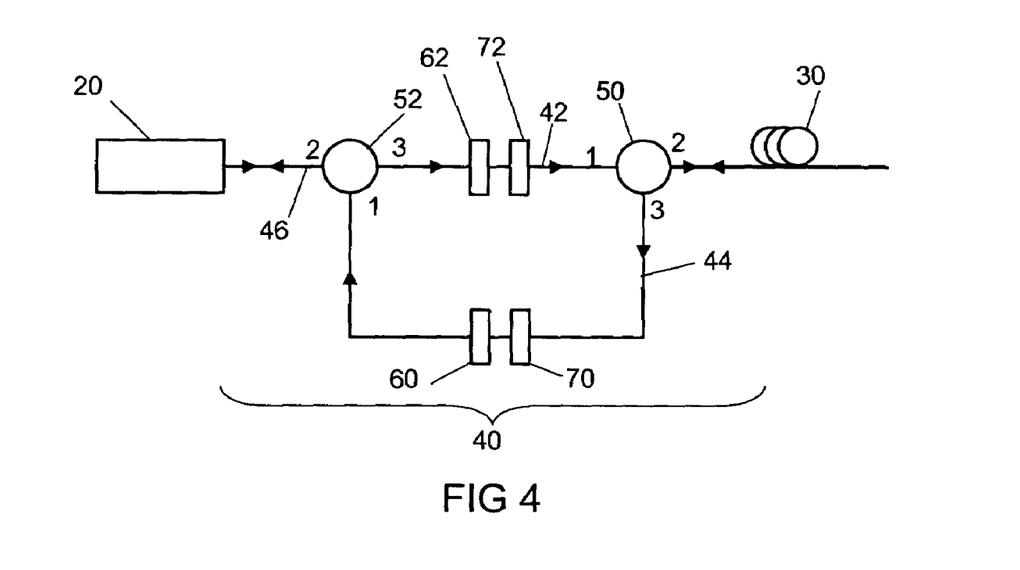
FIG. 4 schematically illustrates a fourth arrangement suitable for use in practicing the method of the present invention.

FIG. 4 illustrates another suitable arrangement comprising either a conventional OTDR (without polarization of the light exiting the OTDR) or a POTDR apparatus which has polarization capability, 20. In the embodiment illustrated in FIG. 4, two optical circulators 50 and 52 are provided. The propagation of light through the optical path 40 is similar to the light travel in the arrangement of FIG. 3. Polarizer 62 and optional wave plate 72 are inserted in the input portion 42 of the optical path 40, and polarization (analyzer) 60 and optional wave plate 70 are inserted in the return portion 44 of the optical path 40. If a POTDR is utilized to generate polarized pulses, polarizer 62 is also optional.

Figure 5:
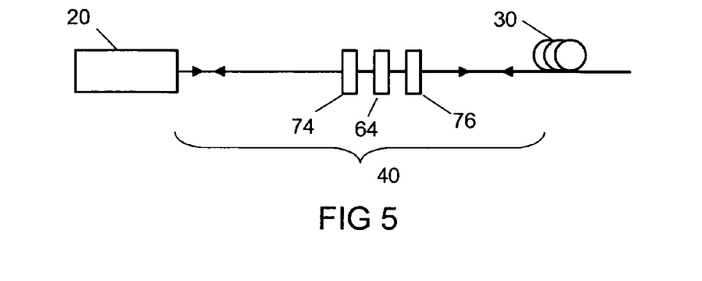
FIG. 5 schematically illustrates a fifth arrangement suitable for use in practicing the method of the present invention.

FIG. 5 illustrates another arrangement capable of being utilized in accordance with the present invention. This arrangement avoids the use of optical circulators. As illustrated in FIG. 5, OTDR 20 launches the pulse light through an optical path 40 comprising an optional wave plate 74, a polarizer 64, and another optional wave plate 76 and into an end of the fiber 30 under test. The backscattered light signal exits through the same end of the fiber 30 and back into the optical path 40 to be polarized before arriving at the detector in the OTDR 20. The optical path 40 between the OTDR 20 and the fiber 30 under test is thus shared by the input pulses and the backscattered light. The OTDR may optionally be a POTDR.

Other optical components may be disposed in the optical path 40 in the embodiments disclosed herein. For example, a polarization controller may be employed to maximize the amount of light launched into the fiber 30 under test. A polarization controller disposed before a polarizer in the optical path 40 can align the state of polarization in the fiber 30 to be incident on the polarizer.

In the embodiments disclosed herein, the light impulses entering the fiber 30 under test are polarized, and the backscattered light is polarized before being detected to effect a polarization sensitive measurement.

Nondegenerate modification of the polarization of the optical path 40 can be effected by, for example, changing the angle of polarization of one or more optical components in the optical path, such as changing the polarizing angle of a polarizer. A rotatable polarizer can be advantageously used for changing the angle of the polarizing axis. If a POTDR is utilized for providing polarized pulses, then the angle of polarization of the pulses emanating from the POTDR may also be changed. In addition, or instead, one or more optical components may be added to the optical path, and/or one or more optical components may be removed from the optical path, in order to nondegenerately modify the polarization of the optical path.

EXAMPLE 1

Figure 6:
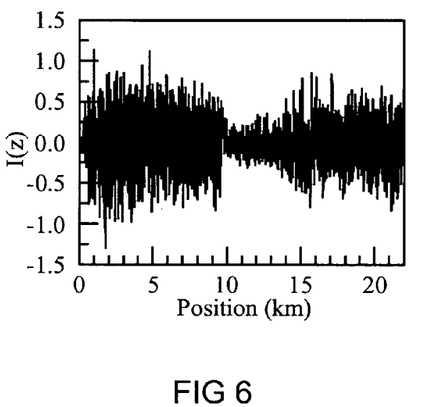
FIG. 6 shows an intensity level composite trace I(z) of a first optical fiber evaluated with the arrangement of FIG. 3.
Figure 7:
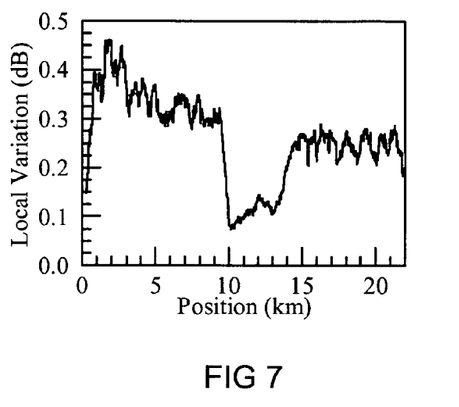
FIG. 7 shows a quantitative representation of the local variation of the composite trace of FIG. 6, in dB, plotted against position along the longitudinal axis of the fiber.

An optical fiber test configuration as illustrated in FIG. 3 was utilized with an optical fiber made to demonstrate an embodiment of the present invention. A 4 km length of optical fiber with elevated fiber PMD of 0.36 ps/sqrt(km) was spliced on either end with optical fibers having PMD values of less than 0.06 ps/sqrt(km). The elevated PMD fiber portion, or "defect fiber portion" was located between 10 km and 14 km measured along the length (i.e. along the longitudinal axis) of the 22 km length of fiber. The angle of polarization of polarizer 62 was fixed for all measurements. The angle of polarization of polarizer 60 was set to 0 degrees and a first POTDR trace was obtained. The angle of polarization of polarizer 60 was then set to 45 degrees (for a difference in polarization angle of 45 degrees) and a second POTDR trace was obtained. The first POTDR trace was multiplied by a weighting factor of 1, and the second POTDR trace was multiplied by a weighting factor of −1, and each weighted trace was linearly combined, i.e. summed, and thus an intensity level composite trace I(z) corresponding to the portion of the length of optical fiber was generated, as seen in FIG. 6. The variation in the region of fiber with elevated PMD (10 to 14 km) can be seen in FIG. 6 in comparison to other regions of the fiber having significantly lower PMD. The variation of intensity level of the composite trace was further analyzed by determining the standard deviation of the composite trace I(z) over a sliding window of data from the composite trace and moving the window of data lengthwise along the length of the fiber while continuing to analyze the variation of intensity. The resulting quantitative representation of the local variation of the composite trace is shown in FIG. 7 in dB plotted against position along the longitudinal axis of the fiber. Thus, information related to the local variation in intensity along the portion of the length of the fiber was produced, and the level of variation of intensity level was shown to relate to the polarization mode dispersion (PMD) distribution in the fiber. Such a test fiber could be used to calibrate, at least roughly, a threshold level for selecting out a fiber or a portion or portions of a fiber that has undesirably elevated PMD.

EXAMPLE 2

Figure 8:
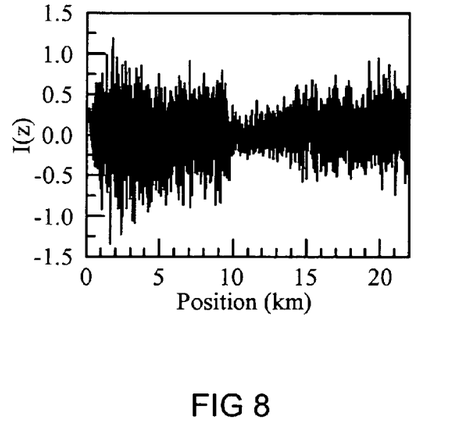
FIG. 8 shows an intensity level composite trace I(z) of the first optical fiber evaluated with the arrangement of FIG. 3 with different polarization settings.
Figure 9:
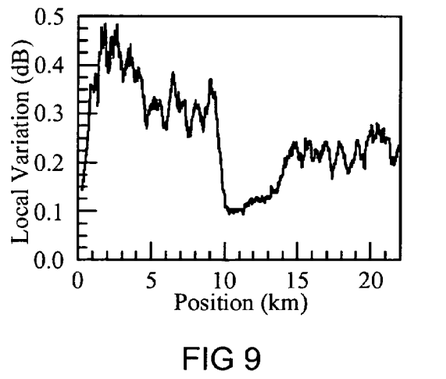
FIG. 9 shows a quantitative representation of the local variation of the composite trace of FIG. 8, in dB, plotted against position along the longitudinal axis of the fiber.

An optical fiber test configuration as illustrated in FIG. 3 was utilized with the optical fiber described in Example 1. The angle of polarization of polarizer 60 was set to 30 degrees and a first POTDR trace was obtained. The angle of polarization of polarizer 60 was then set to 60 degrees (for a difference in polarization angle of 30 degrees) and a second POTDR trace was obtained. The first POTDR trace was multiplied by a weighting factor of 1, and the second POTDR trace was multiplied by a weighting factor of −1, and each weighted trace was linearly combined, i.e. summed, and thus an intensity level composite trace I(z) corresponding to the portion of the length of optical fiber was generated, as seen in FIG. 8. The variation in the region of fiber with elevated PMD (10 to 14 km) can be seen in FIG. 8 in comparison to other regions of the fiber having significantly lower PMD. The variation of intensity level of the composite trace was further analyzed by determining the standard deviation of the composite trace I(z) over a sliding window of data from the composite trace and moving the window of data lengthwise along the length of the fiber while continuing to analyze the variation of intensity. The resulting quantitative representation of the local variation of the composite trace is shown in FIG. 9 in dB plotted against position along the longitudinal axis of the fiber. The results are consistent with the results obtained in Example 1.

EXAMPLE 3

Comparative

Figure 10:
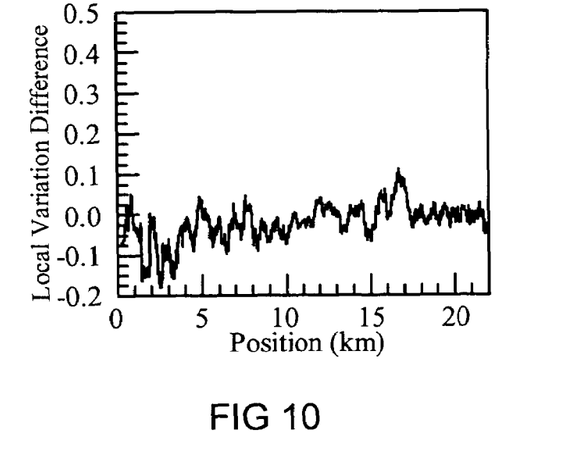
FIG. 10 shows, for comparison with the present invention, the difference between the calculated standard deviations of first and second POTDR traces (local variation difference) obtained for the arrangement, fiber, and polarization settings that were used to obtain the trace of FIGS. 8 and 9.

The method utilized in Examples 1 and 2 can be distinguished from the case of using a single POTDR trace and calculating the local variation. The following inequality can be demonstrated:

$$\sigma(I_{C1}(z)-I_{C2}(z)) \neq \sigma(I_{C1}(z))-\sigma(I_{C2}(z))$$

where $I_{C1}$ and $I_{C2}$ are intensity traces obtained at two distinct polarizer configurations (including polarizer alignment, or angle of polarization, and polarizer plus wave plate combinations), and $\sigma$ is the moving standard deviation. To illustrate, the standard deviation (local deviation) of the first POTDR trace in Example 2 was calculated using a 500 meter moving window, and the standard deviation (local deviation) of the second POTDR trace in Example 2 was calculated using a 500 meter moving window. FIG. 10 shows the difference between the calculated standard deviations from the first and second POTDR traces. The resulting local variation with respect to fiber length hovers around zero, and no clear signature is captured with respect to the location of the fiber section with elevated PMD.

EXAMPLE 4

Figure 11:
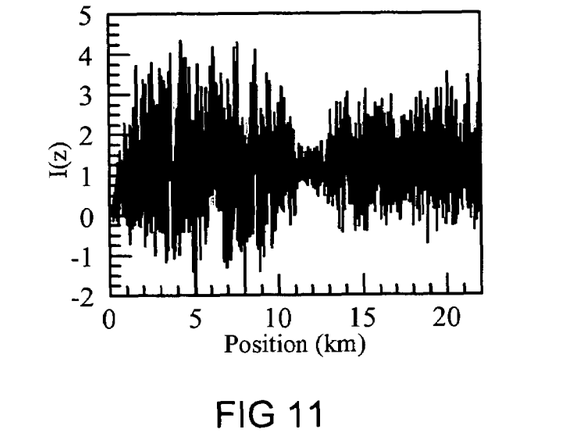
FIG. 11 shows an intensity level composite trace I(z) of a second optical fiber evaluated with the arrangement of FIG. 3.
Figure 12:
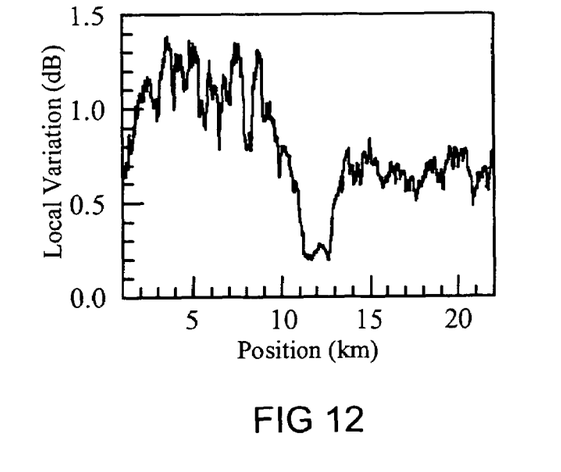
FIG. 12 shows a quantitative representation of the local variation of the composite trace of FIG. 11, in dB, plotted against position along the longitudinal axis of the fiber.

An optical fiber test configuration as illustrated in FIG. 3 was utilized with a POTDR. Corning Incorporated LEAF optical fiber, which was spun at draw, was supplied with a 2 km long optical fiber section having PMD of around 0.14 ps/sqrt(km) which was embedded in the middle of more typical LEAF optical fiber having lower PMD values. The location of the defect (defectively high PMD) was approximately between 11 km and 13 km. The angle of polarization of polarizer 60 was fixed for all measurements, while the orientation of the polarizer 60 was altered with a known angle so that different POTDR traces can be obtained. For example, the angle of polarization of polarizer 60 was set to 15 degrees and a first POTDR trace was obtained. The angle of polarization of polarizer 60 was then set to 75 degrees (for a difference in polarization angle of 60 degrees) and a second POTDR trace was obtained. The first POTDR trace was multiplied by a weighting factor of 1, and the second POTDR trace was multiplied by a weighting factor of –1, and each weighted trace was linearly combined, i.e. summed, and thus an intensity level composite trace I(z) corresponding to the portion of the length of optical fiber was generated, as seen in FIG. 11. The variation in the region of fiber with elevated PMD (11 to 13 km) can be seen in FIG. 11 in comparison to other regions of the fiber having significantly lower PMD. The variation of intensity level of the composite trace was further analyzed by determining the standard deviation of the composite trace I(z) over a sliding window (500 m width) of data from the composite trace and moving the window of data lengthwise along the length of the fiber while continuing to analyze the variation of intensity. The resulting quantitative representation of the local variation of the composite trace is shown in FIG. 12 in dB plotted against position along the longitudinal axis of the fiber.

The inline fiber polarizers 60 and 62 employed in the apparatus disclosed in FIG. 3 serves two main purposes. First, inline fiber polarizer 62 assures that light going into the fiber under test 30 is polarized, although this could also be achieved without the inline fiber polarizer (e.g. by using an OTDR that already emits polarized light). More importantly, inline fiber polarizer 60 serves as an analyzer for light which is backscattered back from the fiber under test to the OTDR, which light provides information on the state of polarization of the optical fiber under test 30. Without the polarizer 60 in place to analyze the backscattered light from the fiber 30, the OTDR would only detect total intensity of the light pulse. However, by incorporating the fiber polarizer 60, information related to the state of polarization along the fiber can also be obtained. This is because, due to geometric asymmetry and strain, optical waveguide fibers carry birefringence. As a result, the state of polarization of a light pulse traveling in the fiber evolves continuously in both the forward propagating direction and backward propagating direction when the light has been backreflected. The insertion of the polarizer 60, which serves as a polarization analyzer before the detector in the OTDR, ensures that the polarization information from different locations of the fiber is captured.

While the standard deviation may be calculated in linear scale, preferably it is calculated in log scale. The preferred size for the sliding data window is 500 to 2000 meters. By sliding the data window along the length of the fiber and continuously calculating standard deviation along the length of the fiber, we generate a new set of data, which we call variation of signals (VOS). The window size indicates the width of the data that is used to calculate one VOS data point. Wider window size gives less variability in the results of VOS.

What is claimed is:

1. A method for measuring polarization mode dispersion in an optical fiber having a longitudinal axis and a length along the longitudinal axis, the method comprising:

(a) sending a plurality of polarized input light pulses into a first end of the length of the optical fiber via an optical path, each polarized input light pulse thereby causing a respective backscattered light signal to exit the first end of the optical fiber and to enter the optical path, whereby a plurality of pulse-signal pairs are generated from the input light pulses and respective backscattered light signals;

(b) effecting a polarization sensitive measurement of the backscattered light signals, thereby obtaining backscatter intensity traces corresponding to a portion of the length of optical fiber;

(c) nondegenerately modifying the polarization of the optical path between the passage of at least two pulse-signal pairs;

(d) generating an intensity level composite trace corresponding to the portion of the length of optical fiber by summing (i) at least one of the backscatter intensity traces, multiplied by a first weighting coefficient, and (ii) at least one other backscatter intensity trace, multiplied by another weighting coefficient of opposite sign to the first weighting coefficient;

(e) analyzing the variation of intensity level of the composite trace, wherein the analyzing step comprises analyzing the variation of intensity over a sliding window of data from the composite trace and moving the window of data lengthwise along the portion of the length of the fiber while continuing to analyze the variation of intensity to thereby produce information related to the local variation in intensity along the portion of the length of the fiber, and relating the level of variation of intensity level to the polarization mode dispersion (PMD) distribution in the fiber.

2. A method for measuring polarization mode dispersion in an optical fiber having a longitudinal axis and a length along the longitudinal axis, the method comprising:
(a) sending a first polarized input light pulse into the length of the optical fiber via an optical path, thereby causing a first backscattered light signal to exit the optical fiber and to enter the optical path; then
(b) effecting a polarization sensitive measurement of the first backscattered light signal, thereby obtaining a first backscatter intensity trace corresponding to a portion of the length of optical fiber; then
(c) nondegenerately modifying the polarization of the optical path; then
(d) sending a second polarized input light pulse into the length of the optical fiber via the optical path, thereby causing a second backscattered light signal to exit the optical fiber and to enter the optical path; then
(e) effecting a polarization sensitive measurement of the second backscattered light signal, thereby obtaining a second backscatter intensity trace corresponding to the portion of the length of optical fiber; then
(f) generating an intensity level composite trace corresponding to the portion of the length of optical fiber by summing (i) the first backscatter intensity trace, multiplied by a weighting coefficient A, and (ii) the second backscatter intensity trace, multiplied by a weighting coefficient B, wherein A and B have opposite signs; then
(g) analyzing the variation of intensity level of the composite trace, wherein the analyzing step comprises analyzing the variation of intensity over a sliding window of data from the composite trace and moving the window of data lengthwise along the portion of the length of the fiber while continuing to analyze the variation of intensity to thereby produce information related to the local variation in intensity along the portion of the length of the fiber, and relating the level of variation of intensity level to the polarization mode dispersion (PMD) distribution in the fiber.

3. The method of claim 2 wherein the polarization sensitive measurement comprises passing the backscattered light signals through a polarizer and into a detector.

4. The method of claim 2 wherein the window of data comprises a width between about 0.5 and 2.0 km.

5. The method of claim 2 wherein the optical fiber is wound around a spool.

6. The method of claim 5 wherein the spool has a barrel diameter between about 7 and 20 cm.

7. The method of claim 2 wherein the optical fiber is spun optical fiber.

8. The method of claim 2 wherein the optical fiber is unspun optical fiber.

9. The method of claim 2 wherein the optical fiber is disposed within a cable.

10. The method of claim 2 wherein the launched pulses comprise a pulse width between about 10 and 500 ns, more preferably between about 50 and 200 ns.

11. A method for measuring polarization mode dispersion in an optical fiber having a longitudinal axis and a length along the longitudinal axis, the method comprising:
(a) sending a first polarized input light pulse into the length of the optical fiber via an optical path, thereby causing a first backscattered light signal to exit the optical fiber and to enter the optical path; then
(b) polarizing the first backscattered light signal;
(c) detecting the polarized first backscattered light signal, thereby obtaining a first backscatter intensity trace corresponding to a portion of the length of optical fiber; then
(d) nondegenerately modifying the polarization of the optical path; then
(e) sending a second polarized input light pulse into the length of the optical fiber via the optical path, thereby causing a second backscattered light signal to exit the optical fiber and to enter the optical path;
(f) polarizing the second backscattered light signal;
(g) detecting the polarized second backscattered light signal, thereby obtaining a second backscatter intensity trace corresponding to the portion of the length of optical fiber; then
(h) generating an intensity level composite trace corresponding to the portion of the length of optical fiber by summing (i) the first backscatter intensity trace, multiplied by a weighting coefficient A, and (ii) the second backscatter intensity trace, multiplied by a weighting coefficient B, wherein A and B have opposite signs; then
(i) analyzing the variation of intensity level of the composite trace, wherein the analyzing step comprises analyzing the variation of intensity over a sliding window of data from the composite trace and moving the window of data lengthwise along the portion of the length of the fiber while continuing to analyze the variation of intensity to thereby produce information related to the local variation in intensity along the portion of the length of the fiber, and relating the level of variation of intensity level to the polarization mode dispersion (PMD) distribution in the fiber.

12. The method of claim 11 wherein the optical path comprises at least one polarizing component.

13. The method of claim 12 wherein the at least one polarizer component is a polarizer.

14. The method of claim 12 wherein step (d) comprises nondegenerately modifying the polarization of the at least one polarizing component.

15. The method of claim 12 wherein the at least one polarizing component is disposed within an OTDR.

16. The method of claim 11 wherein step (d) comprises inserting an additional polarizing component into the optical path.

17. The method of claim 11 wherein the optical path comprises an input path portion and a return path portion.

18. The method of claim 17 wherein the input path portion comprises at least one polarizing component.

19. The method of claim 17 wherein the return path portion comprises at least one polarizing component.

20. The method of claim 17 wherein the return path portion comprises a polarization analyzer.

* * * * *